Patented Oct. 30, 1934

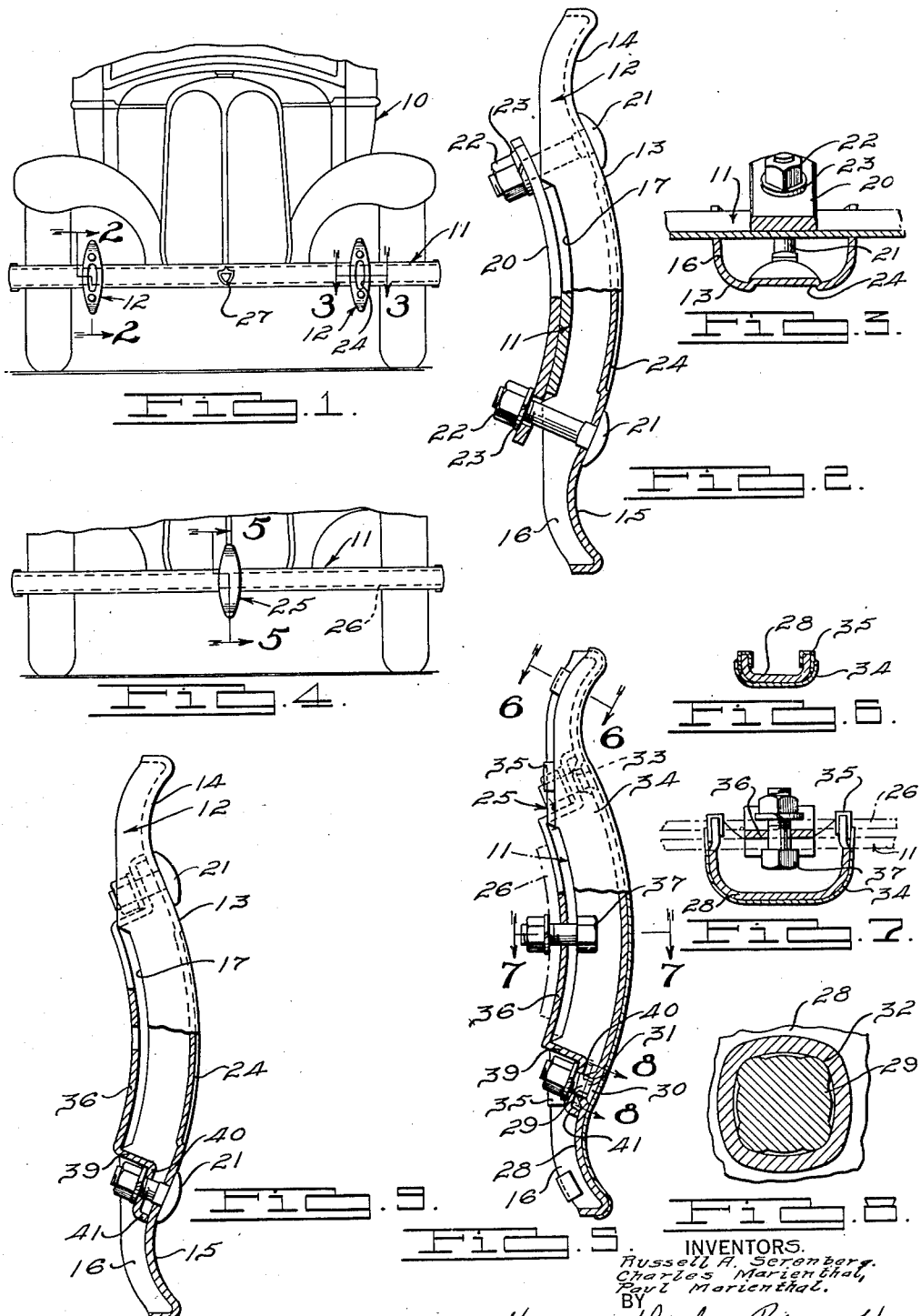

1,978,767

UNITED STATES PATENT OFFICE 1,978,767

BUMPER ATTACHMENT

Russell A. Serenberg, Charles Marienthal, and Paul Marienthal, Detroit, Mich., assignors to Steel Materials Company, a corporation of Michigan Application March 30, 1934, Serial No. 718,150

4 Claims. (Cl. 293—55)

The invention relates to bumpers for motor vehicles and it has particular relation to an auxiliary, bumper attachment.

In conjunction with automobiles, it is not uncommon to have bumpers at different levels on different makes of automobiles and in manipulating an automobile in traffic or in parking, to have the bumper on one machine move under or over the bumper on another machine. When this occurs, fenders or other parts of the automobiles frequently are damaged. Additionally, when the bumper on one automobile moves under or over the bumper on another automobile, frequently the bumpers become locked together and considerable difficulty is encountered in separating the machines.

The object of the present invention is to provide bumper attachments which will positively prevent movement of one bumper on one automobile under or over the bumper of another automobile so as to prevent damage to fenders or other parts of the automobile that frequently has occurred in the manner mentioned.

Another object of the invention is to provide an attachment of this character which is inexpensive in construction, rigid in character and extremely durable in use.

Another object of the invention is to provide a bumper attachment such as mentioned which may quickly be installed on any conventional type of bumper employed without requiring any alteration of the bumper construction.

Another object of the invention is to provide a bumper attachment having the above-mentioned operating characteristics, which is so designed and constructed that it enhances the ornamental appearance of the automobile.

Other objects of the invention will become apparent from the following description taken in conjunction with the drawing and from the claims hereinafter set forth.

For a better understanding of the invention, reference may be had to the drawing illustrating certain forms thereof, wherein:

Figure 1 is a fragmentary, front view of an automobile illustrating a pair of bumper attachments, constructed according to one form of the invention.

Fig. 2 is a cross-sectional view on a larger scale taken substantially along the line 2—2 of Fig. 1.

Fig. 3 is a cross-sectional view on a larger scale taken substantially along the line 3—3 of Fig. 1.

Fig. 4 is a view similar to Fig. 1, illustrating another form of bumper attachment which, as illustrated, is located at the center of the bumper.

Fig. 5 is a cross-sectional view on a larger scale taken substantially along the line 5—5 of Fig. 4.

Fig. 6 is a cross-sectional view taken substantially along the line 6—6 of Fig. 5.

Fig. 7 is a cross-sectional view on a larger scale taken substantially along the line 7—7 of Fig. 5.

Fig. 8 is a cross-sectional view on a larger scale taken substantially along the line 8—8 of Fig. 5.

Fig. 9 is a cross-sectional view similar to Figs. 2 and 5, showing an attachment comprising the combination of certain parts shown in the latter figures.

Referring to Fig. 1, an automobile is indicated at 10, and the front bumper therefor is indicated at 11. For preventing damage to parts of the automobile, particularly by movement of the bumper or other parts of a second automobile, under or over the bumper 11, attachments or shoes 12 are provided at opposite sides of the bumper, which project above and below the latter. Each of these shoes, as shown by Figs. 2 and 3, has an arcuate front face 13 which terminates above and below the bumper in reversely arcuate portions 14 and 15. This design of the ends of the shoe is desirable, because in the event another bumper engages either end of the shoe, it will tend to ride along the arcuate portions 14 and 15 toward the center of the shoe instead of riding over and becoming locked behind the ends of the latter. The shoe generally is of hollow character and this construction is obtained by providing an annular, marginal flange 16 at its inner side. The provision of this flange not only increases the strength and rigidity of the shoe, but also enhances its appearance and provides a means for concealing certain parts. At opposite, vertically disposed sides, the flange 16 is recessed or notched as indicated at 17 for receiving the bumper 11 and it will be noted that in this construction the bumper is arcuate in transverse cross section and that the recesses 17 have arcuate faces substantially complementary to the bumper. The recesses serve as a means for positioning the shoe and preventing vertical slippage thereof.

The shoe is maintained on the bumper by an arcuate clamping plate 20 engaging the inner side of the bumper, which is secured to opposite end portions of the shoe by bolts 21. The heads of the bolts are at the outer side of the shoe and the plate 20 is held against the bumper by nuts 22 and lock washers 23 on the bolts. It will be noted in Fig. 2 that the upper and lower ends of the flanges 16 are curved similarly to the portions 14 and 15 and this is advantageous particularly in the event a second bumper should ride over the shoe as the curvature of the flanges will facilitate pulling the second bumper over or under the shoe as the case may be.

Preferably, the front face of the shoe has a shallow depression 24 and in manufacturing the shoe, symbols or the like may be applied in this depressed area to indicate the make of automobile. Depressing the metal to form the depressed area, also increases the strength of the front wall of the shoe.

In Figs. 4 and 5, a single shoe 25 is illustrated and this is located at the center of the bumper. In the ordinary bumper construction, a spring bar 26 engages the rear side of the bumper at its center and usually and as shown by Fig. 1, a medallion form of bolting device 27 is used to secure the bumper to the bar. In providing the shoe shown in Fig. 4, this medallion preferably is not used and the fastening of the shoe to the bumper also serves to secure the bar 26 to the latter.

In this construction, a shoe element 28 is provided which is substantially identical to the shoe 13 except that bolts 29 are provided which are rigidly associated with the front wall portion of the element. Each of these bolts has a head 30 fitting in a countersunk opening in the front wall and such bolt has a polygonal portion 31 provided with ribs 32 that fit in corner portions provided in the opening. The bolts are rigidly secured in place by axially compressing the ribs 32 and forming shoulders 33 at the inner side of the front wall which, in conjunction with the heads 30, hold the bolts tightly in place.

The shoe element 28 is covered by a metal covering plate 34 substantially complementary thereto, and which preferably is chrome plated or otherwise treated to provide a pleasing and lasting appearance. This covering plate is held on the shoe preferably by providing lips 35 welded or brazed to the covering plate at separated points and which are bent around the flange 16. The covering plate provides a smooth, polished surface and furthermore conceals the bolt heads.

In this construction, a clamping plate 36 is provided which may be disposed between the spring bar 26 and bumper 11, and, instead of using the medallion 27, the clamping plate 36 may be inserted between the spring bar and bumper and secured thereto by a bolt 37. At each of its ends, the clamping plate terminates in an inwardly directed portion 39, in turn terminating in a base portion 40 apertured to receive one of the bolts 29, and at the end of the base portion 40, a flange 41 is provided which is adapted to engage the inner side of the shoe base. It will be appreciated that the clamping plate 36 may be manufactured and assembled with the bumper and that subsequently the shoe may be attached thereto by means of the bolts 29.

In the construction shown by Fig. 9, the clamping plate 36 is employed in conjunction with the type of shoe shown by Fig. 2, and this type of construction can be used at the center of the bumper similarly to the shoe shown by Fig. 5. Any of the constructions shown, however, may be used at any point along the bumper in the manner characteristic of the shoe shown by Fig. 2.

All of the constructions illustrated are extremely durable, strong and are highly efficient for preventing the bumper of one automobile from riding under or over the bumper of a second automobile. The shoes provided for this purpose are so designed and constructed as to guide the bumper of another automobile toward the center of the shoe instead of tending to guide it over the tips of the shoe and into a position behind the latter where it would be difficult to separate the bumpers. However, in the event the bumper does slip over the ends of the shoe, the curvature of the flanges 16 at the inner side of the latter facilitates pulling the bumper forwardly over the end of the shoe. The shoes are adapted to constitute a permanent part of the car and to enhance its appearance and may be manufactured from steel which is chrome plated. The invention provides a means for preventing interlocking of bumpers, bending and crumpling of fenders, and damage to radiators, tire carriers and gasoline tanks. In general, the invention provides a means for preserving the appearance of the automobile and preventing damaging of parts that has frequently occurred owing to the movement of the bumper of one automobile under or over the bumper of another automobile.

Although more than one form of the invention has been described and illustrated in detail, it will be apparent to those skilled in the art that various modifications may be made without departing from the scope of the appended claims.

What we claim is

1. In combination with a substantially horizontal bumper on a vehicle, an elongated sheet metal stamped shoe secured to the bumper and projecting above and below the edges thereof for preventing parts of another vehicle or the like from moving over or under the bumper, said shoe having a front plate and a continuous peripheral marginal flange projecting rearwardly from the front plate and provided on its parallel elongated surfaces with aligned notches receiving the bumper, the back of the shoe being completely open; bolts having heads fixed to said front plate and shanks projecting rearwardly, a shoe clamping plate disposed in back of and within the boundary of the marginal flange of said front plate and having apertures receiving said shanks, and nuts on said shanks in back of said clamping plate.

2. In combination with a substantially horizontal bumper on a vehicle, an elongated sheet metal stamped shoe secured to the bumper and projecting above and below the edges thereof for preventing parts of another vehicle or the like from moving over or under the bumper, said shoe having a front plate and a continuous peripheral marginal flange projecting rearwardly from the front plate and provided on its parallel elongated surfaces with aligned notches receiving the bumper, the back of the shoe being completely open; bolts having heads fixed to said front plate and shanks projecting rearwardly, a shoe clamping plate disposed in back of and within the boundary of the marginal flange of said front plate and having apertures receiving said shanks, and nuts on said shanks in back of said clamping plate, said shoe above and below the bumper being first directed towards the rear and then terminating in end portions directed towards the front.

3. In combination with a substantially horizontal bumper on a vehicle, an elongated sheet metal stamped shoe secured to the bumper and projecting above and below the edges thereof for preventing parts of another vehicle or the like from moving over or under the bumper, said shoe having a front plate and a continuous peripheral marginal flange projecting rearwardly from the front plate and provided on its parallel elongated surfaces with aligned notches receiving the bumper, the back of the shoe being completely open; bolts having heads fixed to said front plate and shanks projecting rearwardly, a shoe clamping plate disposed in back of and within the boundary of the marginal flange of said front plate and having apertures receiving said shanks, and nuts on said shanks in back of said clamping plate, the edges of said flanges, above and below the bumper, being longitudinally curved in a direction forwardly of the bumper.

4. In combination with a substantially horizontal bumper on a vehicle, an elongated sheet metal stamped shoe secured to the bumper and projecting above and below the edges thereof for preventing parts of another vehicle or the like from moving over or under the bumper, said shoe having a front plate and a continuous peripheral marginal flange projecting rearwardly from the front plate and provided on its parallel elongated surfaces with aligned notches receiving the bumper, the back of the shoe being completely open; bolts having heads fixed to said front plate and shanks projecting rearwardly, a shoe clamping plate disposed in back of and within the boundary of the marginal flange of said front plate and having apertures receiving said shanks, and nuts on said shanks in back of said clamping plate, said shoe above and below the bumper being first directed towards the rear and then terminating in end portions directed towards the front, the edges of said flanges, above and below the bumper, being longitudinally curved in a direction forwardly of the bumper.

RUSSELL A. SERENBERG.
CHARLES MARIENTHAL.
PAUL MARIENTHAL.